United States Patent Office 2,890,219
Patented June 9, 1959

2,890,219

ESTERS OF N-(HALO-10-PHENOTHIAZINYL-ALKYL)-N-ALKYLAMINOALKANOLS

John W. Cusic, Skokie, Ill., assignor to G. D. Searle & Co., Chicago, Ill., a corporation of Delaware No Drawing. Application August 22, 1956
Serial No. 605,465

8 Claims. (Cl. 260—243)

This invention relates to esters of N-(halo-10-phenothiazinylalkyl)-N-alkylaminoalkanols and processes for the manufacture thereof. More particularly, this invention relates to compounds of the formula

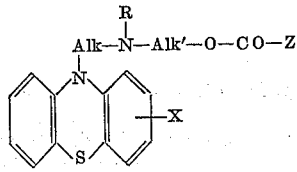

wherein Alk and Alk' are alkylene radicals, the same or different; Z is an alkyl, cycloalkyl, (cycloalkyl)alkyl, aryl, or aralkyl radical; R is a lower alky radical; and X is halogen, optimally chlorine in the 2-position.

The alkylene radicals preferably comprehended by Alk and Alk' in the foregoing structural formula are those containing either 2 or 3 carbon atoms, namely, the ethylene

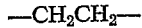

and straight- or branched-chain propylene

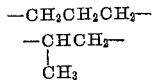

radicals. The aryl radicals referred to in the general formula are either carbocyclic, or they may contain so-called "hetero" atoms such as nitrogen, sulfur, and oxygen. Of the carbocyclic aryl radicals denoted by Z, the phenyl and naphthyl radicals—substituted as desired by one or more alkyl or alkoxy radicals, or by halogen—are preferred. Among the heterocyclic aryl radicals of choice are the pyrrolidyl, pyridyl, quinolyl, pyrimidyl, thienyl, xanthyl, and phenothiazinyl radicals, each of which may or may not be substituted by alkyl radicals and the like. Aralkyl radicals designated by Z in the formula comprise benzyl, phenethyl, and benzhydryl radicals wherein as many as 3 hydrogens may be replaced by alkoxy groupings. The lower alkyl radicals contemplated in the generic formula for compounds of the present invention include methyl, ethyl, propyl, isopropyl, butyl, isobutyl, sec-butyl, tert-butyl, amyl, sec-n-amyl, primary isoamyl, sec-isoamyl, tert-amyl, and like $C_sH_{2s+1}$ radicals wherein $s$ is a positive integer amounting to less than 9.

The compounds to which this invention relates are useful because of their unexpectedly potent pharmacological properties. It is known in the art that the alcohols whence the subject esters are derived manifest desirable biological activity. However, esterification appears to surprisingly enhance such activity. For example, the hereinafter claimed acetate not only produces twice the recognized depressant effect of the parent alcohol on the central nervous system, but a four-fold anti-emetic response. Compounds of the present invention, accordingly, are particularly valuable in the therapeutic control of the vomiting reflex, and by reason of their capacity for depressing the central nervous system, unusually adapted to the induction of tranquility or ataraxia untroubled by mental or emotional excitation.

Equivalent to the basic amines of this invention for the purposes here described are those non-toxic acid-addition salts corresponding thereto of the formula

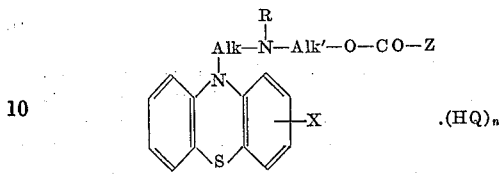

wherein Alk, Alk', Z, R, and X have the meanings hereinbefore assigned; Q is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and $n$ is an integer amounting to one when merely a single basic nitrogen atom occurs in the parent amine, or may be two when more than one basic nitrogen is present.

The amine bases which comprise this invention are relatively insoluble in water, but may be dissolved in dilute acids and in such of the common organic solvents as alcohol, propylene glycol, ethyl acetate, ether, and benzene. The acid-addition salts of this invention are, on the other hand, soluble in water and in aqueous solutions of alcohol or other water-miscible organic solvents. The subject compounds may be administered in solid form as tablets or capsules; dissolved or suspended in aqueous media, they may be given parenterally.

The compounds of the present discovery may be manufactured by interaction of a suitable N-(halo-10-phenothiazinylalkyl)-N-alkylaminoalkanol with an acid anhydride or chloride of choice, using an inert solvent as the reaction medium, and with pyridine optionally present as a catalyst. Conversion of the amine bases of the invention to corresponding acid-addition salts is accomplished by simple admixture of these compounds with one or two equivalents of any of various inorganic and strong organic acids, the anionic portion of which conforms to Q as hereinabove defined.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of material in parts by weight, except as otherwise noted.

Example 1

A. *2-[N-methyl-3-(2-chloro-10-phenothiazinyl)-propylamino]ethyl acetate.*—To a solution of 4 parts of 2-[N-methyl-3-(2-chloro-10-phenothiazinyl)propylamino]-ethanol in 22 parts of toluene is cautiously added 1 part of acetyl chloride. Heat is evolved. The reaction mixture is let stand overnight and then extracted with dilute aqueous muriatic acid. The aqueous extract is made basic and, in turn, extracted with benzene. The benzene extract is dried over anhydrous potassium carbonate, following which solvent is evaporated and the residue distilled. There is obtained by this means 2-

[N-methyl-3-(2-chloro-10-phenothiazinyl)propylamino]ethyl acetate boiling at 207–210° C. under 0.25 mm. pressure. The product has the formula

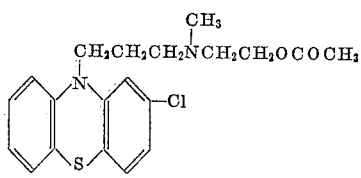

B. *2-[N-methyl-3-(2-chloro-10-phenothiazinyl)-propylamino]ethyl acetate hydrochloride.*—2-[N-methyl-3-(2-chloro-10-phenothiazinyl)propylamino]ethyl acetate is converted to the corresponding hydrochloric acid salt by dissolving the basic ester in anhydrous ether and treating this solution with one equivalent of hydrogen chloride dissolved in isopropyl alcohol. The salt comes down as an insoluble oil from which the supernatant solvent is removed by evaporation. The product has the formula

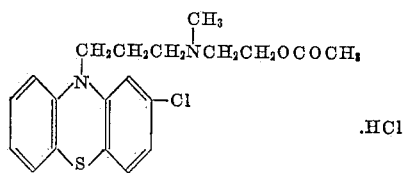

Example 2

A. *2-[N-methyl-3-(2-chloro-10-phenothiazinyl)propylamino]ethyl palmitate.*—A mixture of 10 parts of 2-[N-methyl-3-(2-chloro - 10 - phenothiazinyl)propylamino]-ethanol, 68 parts of dry toluene, 5 parts of pyridine, and 11 parts of palmitoyl chloride is heated at the boiling point for 3 hours under reflux. The reaction mixture is let stand overnight, then boiled for an additional 3 hours under reflux and, finally, extracted at room temperatures with dilute aqueous muriatic acid. The aqueous extract is made basic with 40 percent aqueous caustic soda, following which it is extracted with a mixture of ether and benzene. Evaporation of solvent leaves as the residue 2-[N-methyl-3-(2-chloro-10-phenothiazinyl)propylamino]ethyl palmitate, which may be further purified via chromatography of the hydrochloric acid salt as described in Part B of this example. The product has the formula

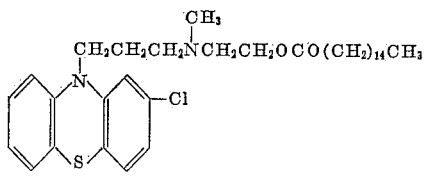

B. *2-[N-methyl-3-(2-chloro-10-phenothiazinyl)propylamino]ethyl palmitate hydrochloride.*—The basic ester obtainable by the procedure detailed in Part A of this example is mixed with a slight excess of 5 percent aqueous muriatic acid and heated to the boiling point of the aqueous phase. After cooling, supernatant water is decanted and the residue taken up in hexane. Chromatography on silica gel—using methyl alcohol and acetone as developing solvents—and evaporation of the eluate comprising approximately 50 percent methyl alcohol gives a residue, which, on treatment in anhydrous ether solution with a slight excess of hydrogen chloride dissolved in isopropyl alcohol, affords, following evaporation of solvent, 2-[N-methyl-3-(2-chloro-10-phenothiazinyl)propylamino]ethyl palmitate hydrochloride. The product is converted to pure 2-[N-methyl-3-(2-chloro-10 - phenothiazinyl)propylamino]ethyl palmitate by addition of excess aqueous alkali, extraction of the resultant mixture with ether and benzene, and evaporation of the solvents present.

Example 3

A. *3-[N-butyl-2-(2-chloro-10-phenothiazinyl)ethylamino]propanol.*—A mixture of 30 parts of N-β-chloroethyl-2-chlorophenothiazine, 12 parts of 3-n-butylaminopropanol, 14 parts of anhydrous potassium carbonate, 15 parts of sodium iodide, and 240 parts of butanone is heated, with agitation, at the boiling point under reflux for 10 hours. After cooling, the mixture is filtered and freed of solvent by distillation. The residue is taken up in dilute aqueous muriatic acid, and this solution is washed with ether. The solution is then made alkaline with dilute aqueous caustic soda and, finally, extracted with chloroform. The chloroform extract is dried over anhydrous potassium carbonate and stripped of solvent by distillation, leaving as a residue 3-[N-butyl-2-(2-chloro-10-phenothiazinyl)ethylamino]propanol, the formula of which is

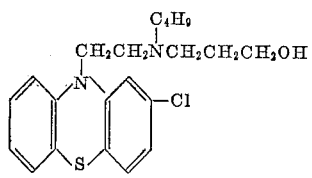

B. *3-[N-butyl-2(2-chloro-10-phenothiazinyl)ethylamino]propyl valerate.*—To a solution of 7 parts of 3-[N-butyl-2-(2-chloro - 10 - phenothiazinyl)ethylamino]propanol in 110 parts of anhydrous chloroform at room temperatures is cautiously added 2 parts of valeryl chloride, agitation being maintained throughout. The mixture is let stand at room temperatures overnight and then extracted with water. The aqueous extract is made alkaline and thereupon extracted with chloroform. The chloroform extract is dried over anhydrous potassium carbonate, following which chloroform is removed by distillation. The residue, a thick oil, is 3-[N-butyl-2-(2-chloro-10-phenothiazinyl)ethylamino]propyl valerate, having the formula

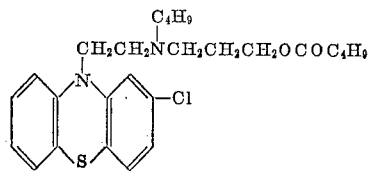

Example 4

A. *2-[N-methyl-3-(2-chloro-10-phenothiazinyl)propylamino]ethyl 3-cyclopentylpropionate.*—To a solution of 46 parts of 2-[N-methyl-3-(2-chloro-10-phenothiazinyl)-propylamino]ethanol in 435 parts of dry toluene is added 24 parts of 3-cyclopentylpropionyl chloride. Heat is evolved and an oil is thrown down, which appears to solubilize on standing. After 2 hours, the reaction mixture is washed with an excess of dilute aqueous potassium carbonate and then dried over anhydrous potassium carbonate. Distillation yields 2-[N-methyl-3-(2-chloro-10-phenothiazinyl)propylamino]ethyl 3-cyclopentylpropionate, boiling at 258–261° C. under 0.25 mm. pressure. The product has the formula

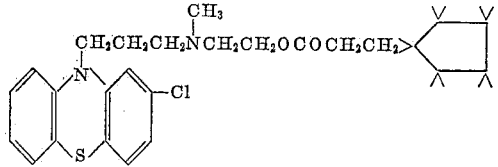

B. *2-[N-methyl-3-(2-chloro-10-phenothiazinyl)propylamino]ethyl 3-cyclopentylpropionate hydrochloride.*—The basic ester of the preceding Part A of this example is converted to the corresponding hydrochloric acid salt by dissolution in anhydrous ether and treatment of the resultant solution with one equivalent of hydrogen chloride dissolved in absolute isopropyl alcohol.

Example 5

2-[N-methyl-3-(2-chloro-10-phenothiazinyl)propylamino]ethyl cyclohexanecarboxylate.—To a solution of 6 parts of 2-[N-methyl-3-(2-chloro-10-phenothiazinyl)-propylamino]ethanol in 45 parts of dry toluene and 5 parts of pyridine is added approximately 12 parts of cyclohexanecarboxylic acid chloride. Heat is evolved. The temperature of the reaction mixture is raised to the boiling point of the solvent present and maintained thereat, under reflux, for 2 hours. The mixture is then let stand overnight, following which it is made alkaline with excess solid sodium carbonate. The mixture is next extracted with dilute aqueous muriatic acid, throwing down an oil, which, together with the aqueous phase, is washed with ether. Excess solid potassium carbonate is again introduced, whereupon the resultant mixture is extracted with ether. The ether extract is dried over anhydrous potassium carbonate and treated with decolorizing charcoal. Removal of solvent by evaporation in vacuo leaves a residue which is distilled under 0.2 mm. pressure to give 2-[N-methyl-3-(2-chloro-10-phenothiazinyl)propylamino]ethyl cyclohexanecarboxylate, of the formula

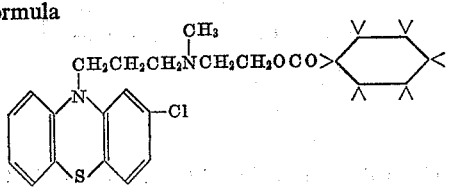

Example 6

A. 2-[N-methyl-3-(2-chloro-10-phenothiazinyl)propylamino]ethyl 3,4-dimethoxyphenylacetate.—A mixture of 5 parts of 2-[N-methyl-3-(2-chloro-10-phenothiazinyl)-proplyamino]ethanol, 15 parts of 3,4-dimethoxyphenylacetyl chloride, 45 parts of dry toluene, and 5 parts of pyridine is heated at the boiling point under reflux for 6 hours. Solvent is then stripped by vacuum distillation, following which the residue is made alkaline with excess aqueous caustic soda and extracted with benzene. The benzene extract is mixed with excess aqueous muriatic, precipitating an oil. The benzene layer is removed, following which the oil-and-water mixture remaining is made alkaline with 40 percent aqueous caustic soda and then extracted with benzene. The purified benzene extract is dried over anhydrous sodium sulfate and stripped of solvents by distillation. The residue is 2-[N-methyl-3-(2-chloro-10-phenothiazinyl)propylamino]-ethyl 3,4-dimethoxyphenylacetate, the formula of which is

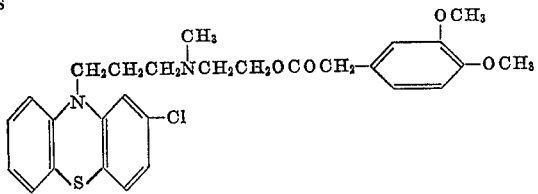

B. 2-[N-methyl-3-(2-chloro-10-phenothiazinyl)propylamino]ethyl 3,4-dimethoxyphenylacetate hydrochloride.—Approximately 6 parts of the basic ester described in the preceding Part A of this example is taken up in a minimum quantity of benzene to which anhydrous ether is subsequently added. A slight excess of hydrogen chloride dissolved in absolute isopropyl alcohol is then added, precipitating, on chilling, a reddish, hygroscopic solid. The material thus obtained is 2-[N-methyl-3-(2-chloro-10-phenothiazinyl)propylamino)ethyl 3,4-dimethoxyphenylacetate hydrochloride.

Example 7

A. 2-[N-methyl-3-(2-chloro-10-phenothiazinyl-propylamino]ethyl 3,4,5-trimethoxybenzoate.—A solution of 4 parts of 2-[N-methyl-3-(2-chloro-10-phenothiazinyl)propylamino]ethanol and 10 parts of 3,4,5-trimethoxybenzoic acid anhydride in 50 parts of pyridine is heated at the boiling point under reflux for 20 hours. Pyridine is removed by vacuum distillation and the residue taken up in a mixture of benzene and ether. Addition to the combined benzene and ether solutions of excess dilute aqueous muriatic acid precipitates an oil which, together with the aqueous phase, is separated and made alkaline with 40 percent aqueous caustic soda. The resultant mixture is extracted with benzene and ether, the extracts thus obtained being combined, dried over anhydrous sodium sulfate, treated with decolorizing charcoal, and finally stripped of solvents by vacuum distillation. The gummy residue is mixed well with hexane containing a small amount of anhydrous ether, and the material which remains insoluble therein (probably 3,4,5-trimethoxybenzoic acid) is removed by filtration. The filtrate, on evaporation, yields 2-[N-methyl-3-(2-chloro-10-phenothiazinyl)propylamino]ethyl 3,4,5-trimethoxybenzoate, of the formula

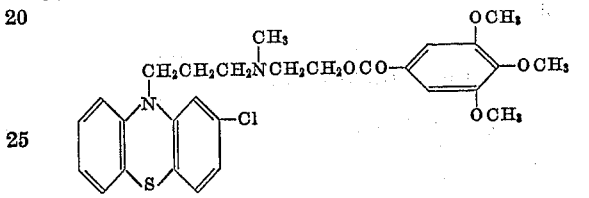

B. 2-[N-methyl-3-(2-chloro-10-phenothiazinyl)-propylamino]ethyl 3,4,5-trimethoxybenzoate hydrochloride.—To an anhydrous ether solution of the basic ester of the foregoing Part A of this example is added excess hydrogen chloride dissolved in absolute isopropyl alcohol. An oil is thrown down, which solidifies on replacement of supernatant solvent with ether, and refrigeration. Decantation of ether affords the hygroscopic product, 2-[N-methyl-3-(2-chloro-10 - phenothiazinyl)propylamino]ethyl 3,4,5-trimethoxybenzoate hydrochloride.

Example 8

A. 2-[N-methyl-3-(2-chloro-10-phenothiazinyl)propylamino]ethyl nicotinate.—A mixture of 5 parts of 2-[N - methyl - 3 - (2-chloro-10-phenothiazinyl)propylamino]-ethanol, 6 parts of nicotinyl chloride hydrochloride, 13 parts of pyridine, and 45 parts of dry toluene is heated for a total of 10 hours at the boiling point under reflux. The mixture is allowed to stand at room temperatures overnight. A crystalline solid precipitates. The mixture is diluted with benzene and made alkaline with aqueous caustic soda. The organic solvent layer is separated, washed with water, and extracted with dilute aqueous muriatic acid. The aqueous extract is made basic with 40 percent aqueous caustic soda and then extracted with ether. The ether extract is washed with water and finally dried over anhydrous potassium carbonate and treated with decolorizing charcoal. Evaporation of solvent leaves as a residue, pure 2-[N-methyl-3-(2 - chloro-10-phenothiazinyl)propylamino]ethyl nicotinate, of the formula

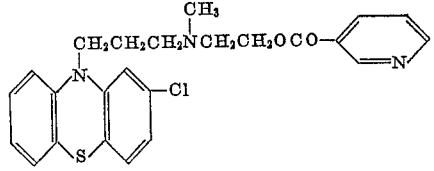

B. 2-[N-methyl - 3-(2-chloro-10-phenothiazinyl)-propylamino]ethyl nicotinate dihydrochloride.—The basic ester of the preceding Part A of this example is converted to the hydrochloric acid salt by dissolving the ester in anhydrous ether and adding to this solution two equivalents of hydrogen chloride dissolved in absolute isopropyl alcohol. The solid precipitate which forms is filtered off and recrystallized from absolute ethanol containing a small amount of anhydrous ether. 2-[N-methyl-3-(2 - chloro - 10 - phenothiazinyl)propylamino]ethyl nicotinate dihydrochloride thus prepared is a yellowish, extremely hygroscopic solid. It has the formula

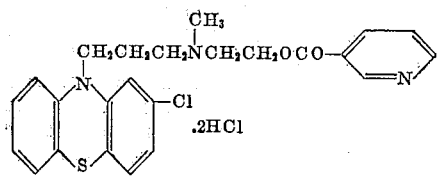

Example 9

2-[N - methyl-3-(2-chloro-10-phenothiazinyl)-propylamino]ethyl isonicotinate.—Using the technique described in Example 8A above, but substituting a like quantity of isonicotinyl chloride hydrochloride for the nicotinyl chloride hydrochloride therein specified, there is obtained 2-[N-methyl - 3 - (2 - chloro-10-phenothiazinyl)-propylamino]ethyl isonicotinate as a viscous oil, the formula for which is

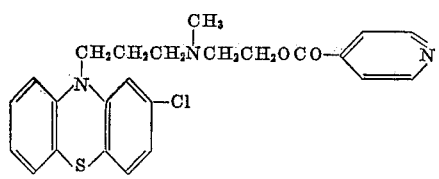

What is claimed is:
1. A compound of the formula

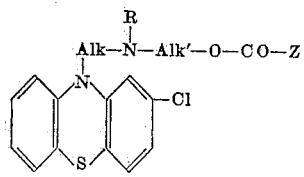

wherein Alk and Alk' are alkylene radicals containing at least 2 and fewer than 4 carbon atoms, R is a lower alkyl radical, and Z is selected from the group consisting of alkyl, cyclopentylethyl, cyclohexyl, dimethoxybenzyl, trimethoxyphenyl, and pyridyl radicals.

2. A compound of the formula

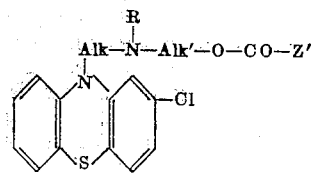

wherein Alk and Alk' are alkylene radicals containing at least 2 and fewer than 4 carbon atoms, R is a lower alkyl radical, and Z' is an alkyl radical.

3. 2-[N-methyl-3-(2-chloro-10 - phenothiazinyl)-propylamino]ethyl acetate.

4. 2-[N-methyl-3-(2-chloro - 10-phenothiazinyl)-propylamino]ethyl cyclohexanecarboxylate.

5. 2-[N-methyl-3-(2 - chloro-10-phenothiazinyl)-propylamino]ethyl 3,4-dimethoxyphenylacetate.

6. A compound of the formula

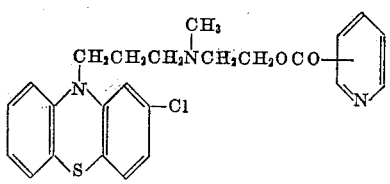

7. 2-[N-methyl-3-(2-chloro-10 - phenothiazinyl)-propylamino]ethyl nicotinate.

8. 2-[N-methyl-3-(2-chloro - 10-phenothiazinyl)-propylamino]ethyl 3-cyclopentylpropionate.

References Cited in the file of this patent
UNITED STATES PATENTS

| | | |
|---|---|---|
| 2,512,520 | Cusic | June 20, 1950 |
| 2,591,679 | Cusic | Apr. 8, 1952 |